Jan. 1, 1963 C. W. UPTON, JR., ETAL 3,071,668

CIRCUIT INTERRUPTERS

Filed Dec. 30, 1958 5 Sheets-Sheet 1

Jan. 1, 1963 C. W. UPTON, JR., ETAL 3,071,668

CIRCUIT INTERRUPTERS

Filed Dec. 30, 1958 5 Sheets-Sheet 2

United States Patent Office 3,071,668

Patented Jan. 1, 1963

3,071,668

CIRCUIT INTERRUPTERS

Chester W. Upton, Jr., Penn Township, Westmoreland County, and Earl F. Beach, Penn Township, Allegheny County, Pa., assignors to Westinghouse Electric Corporation, East Pittsburgh, Pa., a corporation of Pennsylvania Filed Dec. 30, 1958, Ser. No. 783,954
10 Claims. (Cl. 200—145)

This invention relates to circuit interrupters in general, and, more particularly to arc-extinguishing structures and contact operating arrangements therefor. The invention has particular applicability to load-break disconnecting switches of the air-break type involving multiple series contacts and used, for example, for capacitor-bank switching operations.

A general object of the invention is to provide an improved circuit interrupting structure, in which a plurality of serially related breaks are simultaneously established at very high initial velocities.

Another object of the invention is to provide an improved multiple-break contact arrangement for a circuit interrupter, in which a plurality of rotatable contacts are carried by a rotatable operating shaft, and in which a plurality of cooperable, mating, rotatable contacts are carried upon a second operating shaft, extending generally parallel to the first said operating shaft, and means are provided preferably to effect the simultaneous rotation of both operating shafts in opposite directions to obtain thereby very rapid multiple-break separation during the opening operation.

Another object of the invention is to provide an improved load-break disconnecting switch in which an improved interrupting assembly is associated with the break-jaw end of the disconnecting switch.

A further object of the invention is to provide an improved load-break disconnecting switch, in which not only is there provided a rotatable insulator column disposed adjacent the hinge end of the movable disconnecting switch blade, but also suitable linkage is provided extending lengthwise along the grounded supporting base to effect simultaneous rotation of a second rotatable insulator stack, the other end of which is employed to effect opening and closing operation of the contact structure associated with an interrupting assembly supported at the break-jaw end of the load-break disconnecting switch.

A further object of the invention is to provide an improved multiple-break type of circuit interrupter, in which the contact structure is very compact and high speed in operation.

Another object is to provide an improved interrupting structure of the multiple-break type, which is particularly adaptable for operation within a hollow, cylindrical, insulating casing.

An ancillary object of the invention is to provide an improved circuit-interrupting structure of the type specified in the immediately preceding paragraph, in which novel separating insulating barrier structure is spaced lengthwise within the hollow insulating casing, separating immediately adjacent cooperable contacts to prevent flash-over therebetween.

Yet a further object of the invention is to provide an improved load-break disconnecting switch, in which novel toggle means are provided to effect snap-opening and snap-closing operation of the separable contact structures.

The invention has particular applicability, but is not limited, to use in the switching of capacitor banks utilized in transmission systems. As well known by those skilled in the art, the power industry is using more capacitor banks every year to regulate the current characteristics of their transmission systems. There is a definite need for a simple, compact device, other than a power circuit breaker, for switching these capacitor banks, as the load changes. In addition, it is desirable to provide a load-break switching device, which is inexpensive and which is dependable in operation.

It is well known that preferably a capacitor switch must operate in such a way as to avoid overvoltage switching surges. It is, therefore, necessary to interrupt the arc at the first current zero, and at this time the contacts preferably should be separated sufficiently to withstand the restored voltage.

It is proposed, as an auxiliary feature of the present invention, to utilize novel contact structure and contact operating means in conjunction with the unusual properties of sulfur hexafluoride gas ($SF_6$) to result in a capacitor switch of extremely desirable characteristics.

Although the invention is described in connection with its use with a sulfur-hexafluoride, load-break disconnecting switch, it is to be understood that this particular medium does not constitute an essential part of the invention, and that the invention may be employed in conjunction with other interrupting mediums or, as a matter of fact, in atmospheric air alone. More efficient operation results, however, when a highly effective arc-interrupting medium, such as sulfur hexafluoride is utilized, but, by a description of the use of the invention with $SF_6$, it is not intended to limit the invention to use with this particular medium.

Further objects and advantages will readily become apparent upon reading the following specification, taken in conjunction with the drawings, in which.

Figures 1, 2:
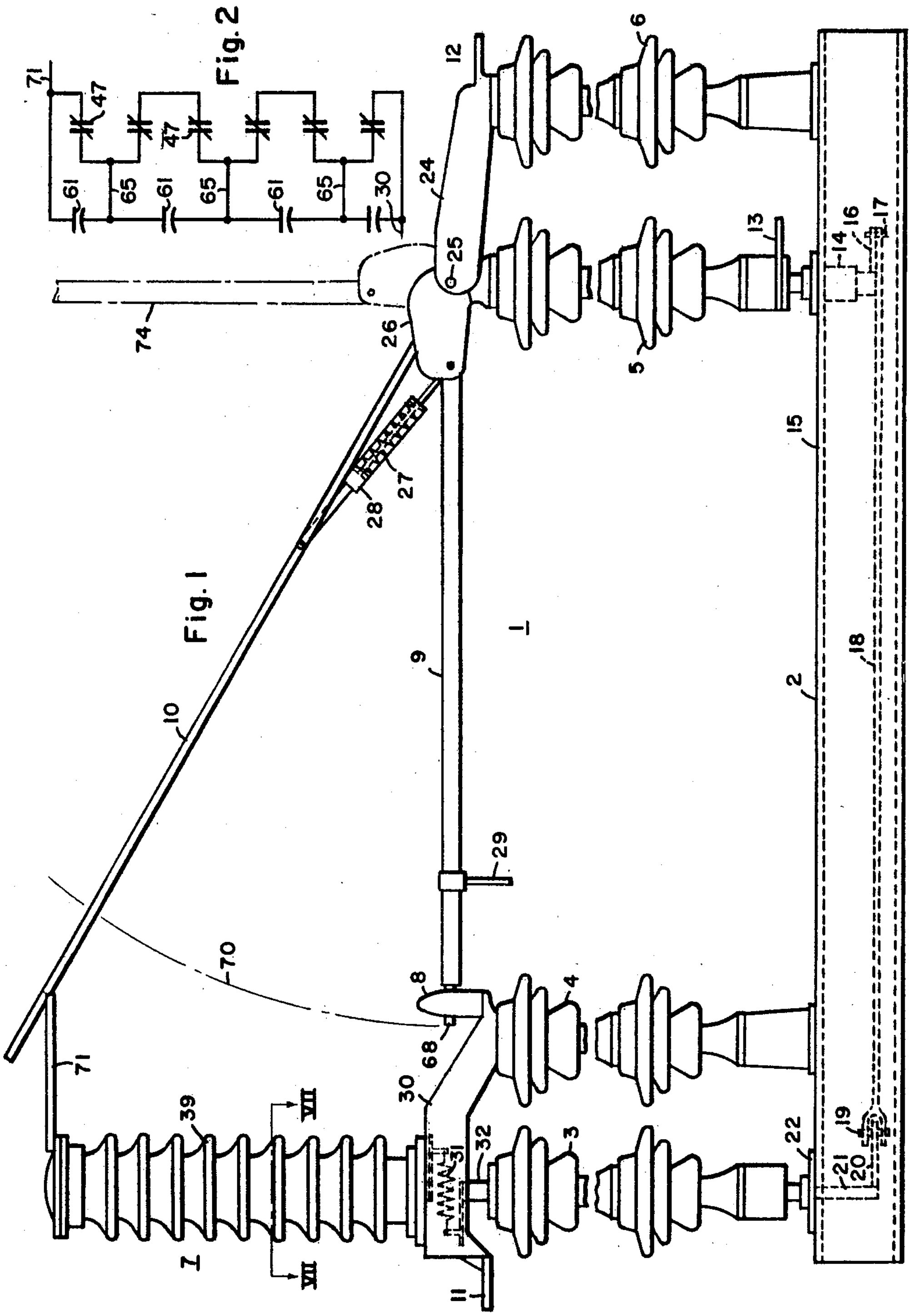
FIG. 1 is a side elevational view of a load-break disconnecting switch embodying the principles of the invention, the contact structure being illustrated in the closed-circuit position.
FIG. 2 is a schematic diagram of the contact structure, and the series capacitance voltage dividers disposed within the interrupting unit of the load-break disconnecting switch of FIG. 1, the contact structure being shown in the closed-circuit position.

Referring to the drawings, and more particularly to FIG. 1 thereof, the reference numeral 1 generally designates a load-break disconnecting switch, which may be employed on transmission-line systems for the switching of capacitor banks, the latter being employed for voltage regulation. Reference may be made to United States Patent 2,806,110, issued September 10, 1957, to Winthrop M. Leeds, and assigned to the assignee of the instant application, particular attention being directed to FIG. 12 of this patent, for a detailed description of the use and switching of capacitor banks.

As well known by those skilled in the art, such power capacitor banks are provided for power-factor correction and also for voltage control. The amount of power-factor correction will, of course, depend upon the particular load being carried. For one type of load it may be desirable to have only one section of a power capacitor bank brought into service, and for another type of load it may be desirable to bring in additional sections of a capacitor bank. Capacitor bank switching operations are, therefore, necessary for proper voltage control.

Generally, the load-break disconnecting switch 1 of FIG. 1 includes a base 2, which may have a channel configuration, as shown, and upstanding insulator stacks 3, 4, 5, 6 extending upwardly from the base 2 and supporting at the upper ends thereof an interrupting assembly generally designated by the reference numeral 7, relatively stationary jaw disconnecting contacts 8, a rotatable movable disconnecting switch blade 9, together with its auxiliary blade 10, and terminal pads 11, 12 for connection to transmission-line connectors.

Preferably, the insulator stack 5 is rotatable, for operation of the load-break disconnecting switch 1. For this purpose insulator stack 5 has a lower crank arm 13, which may be manually rotated or actuated by a motor-driven mechanism. The rotatable insulator stack 5 has a bearing shaft 14 extending downwardly through the web portion 15 of the channel-shaped metallic base 2, and at the lower end thereof carries a crank arm 16. At the outer free end of the crank arm 16 is pivotally connected, by a pin 17, a connecting link 18, the left-hand end of which is pivotally connected, as at 19, to a crank arm 20 carried at the lower extremity of a second bearing shaft 21.

The bearing shaft 21 extends upwardly, through the web 15 of base 2, and carries at its upper end the rotatable insulator stack 3, the rotation of which effects operation of the contact structure disposed interiorly within the interrupting assembly 7. Preferably a flange bearing 22 is associated with the shaft 21 to support the weight of rotatable insulator stack 3.

Disposed at the upper end of stationary insulator column 6 is a casting support 24, having the terminal pad 12 as one extension thereof, and providing a pivotal bearing support 25 to accommodate the swinging upward rotative movement of the main movable disconnecting switch blade 9. Disposed at the upper end of rotatable insulator stack 5 is a cam housing 26, which encloses a cam mechanism, which may be of the type illustrated and claimed in United States Patent 2,436,296, issued February 17, 1948.

The auxiliary contact blade 10 is preferably pivotally mounted about the pivot axis 25 and is biased, by a spring 27 enclosed within a spring housing 28, toward the main switch blade 9. The disconnecting switch blade 9 itself has a laterally extending pickup arm 29, which serves to pick up the auxiliary blade 10 during the opening operation, as described more in detail hereinafter.

As illustrated in FIG. 1, the outer free-extremity of the main movable disconnecting switch blade 9 makes contacting engagement with the stationary jaw contact 8, constituting one extremity of a mechanism housing casting 30. Disposed interiorly within the mechanism housing casting 30 is an overcenter spring toggle mechanism 31 for operating the interrupting assembly 7, as more fully described hereinafter.

Figure 3:
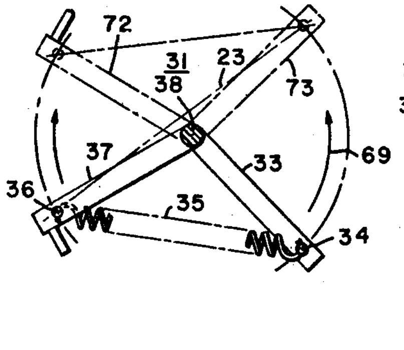
FIG. 3 is a diagrammatic illustration of the toggle-operating linkage utilized at the lower end of the interrupting unit, the several parts being illustrated in the closed-circuit position.
Figure 5:
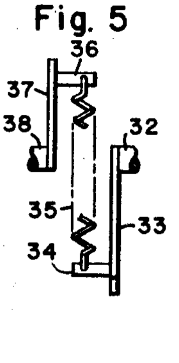
FIG. 5 is a fragmentary end view of the contact arms in FIGS. 3 and 4 showing their relative position.
Figure 4:
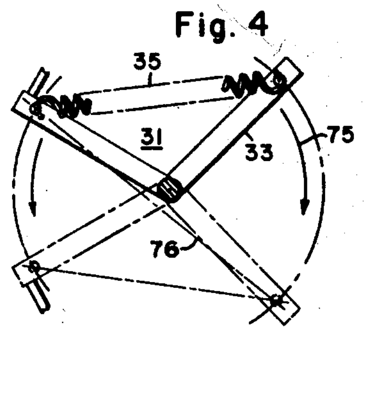
FIG. 4 is a schematic view, similar to that of FIG. 3, but illustrating the position of the several parts in the open-circuit position.

FIGS. 3–5 illustrate schematically the overcenter spring toggle mechanism 31 associated with the shaft 32, positioned at the upper end of rotatable insulator stack 3. As more clearly shown in FIG. 5, the shaft 32 carries a laterally extending crank arm 33. Extending upwardly from the crank arm 33 is a spring support 34, to which is secured one end of a tension spring 35. The other end of the tension spring 35 is secured to a spring support 36 extending downwardly from a crank arm 37 fixed to the lower end of a driving tube 38. The driving tube 38 extends upwardly interiorly within the hollow cylindrical casing 39 of the interrupted assembly 7 and is shown more clearly in FIGS. 6 and 7 of the drawings.

Figure 7:
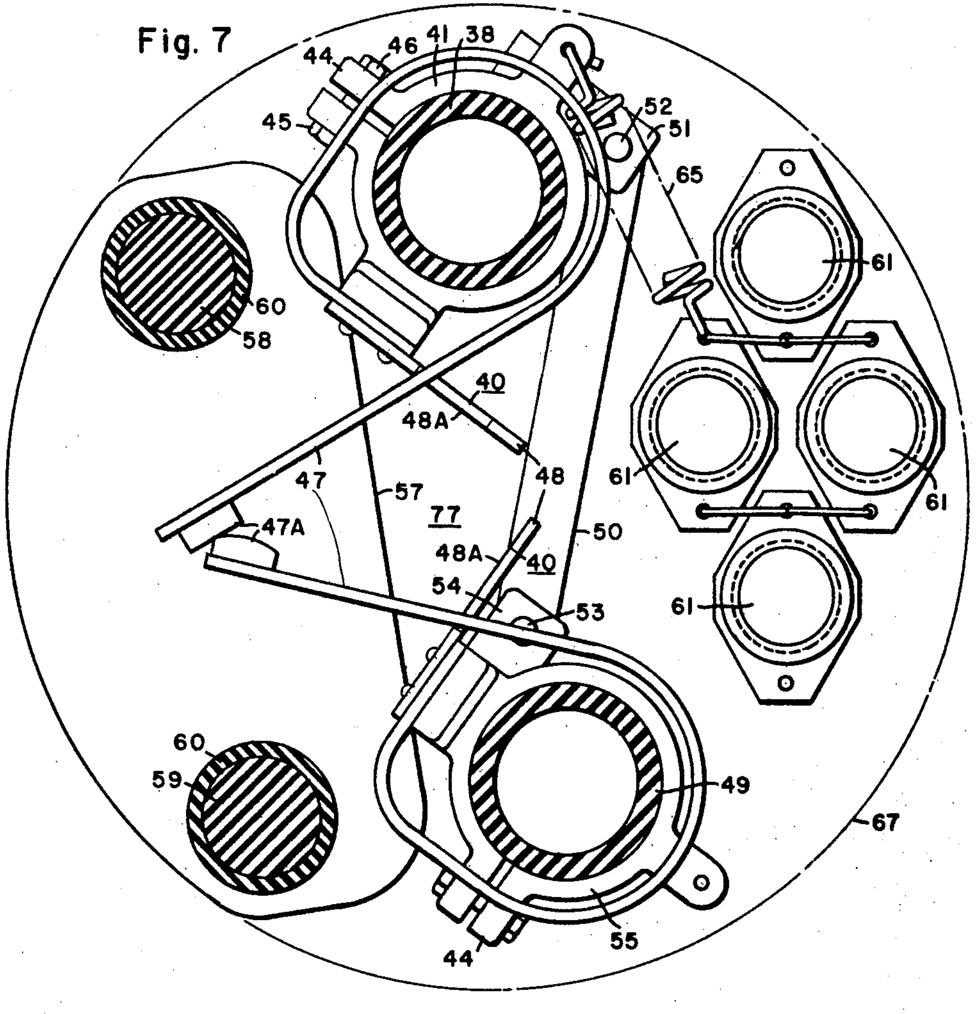
FIG. 7 is a sectional view taken substantially along the line VII—VII of FIG. 1, illustrating, in enlarged fashion, the contact structure, the barrier structure and the disposition of the capacitance voltage-dividing tubes, with the contact structure being illustrated in the closed-circuit position.
Figure 6:
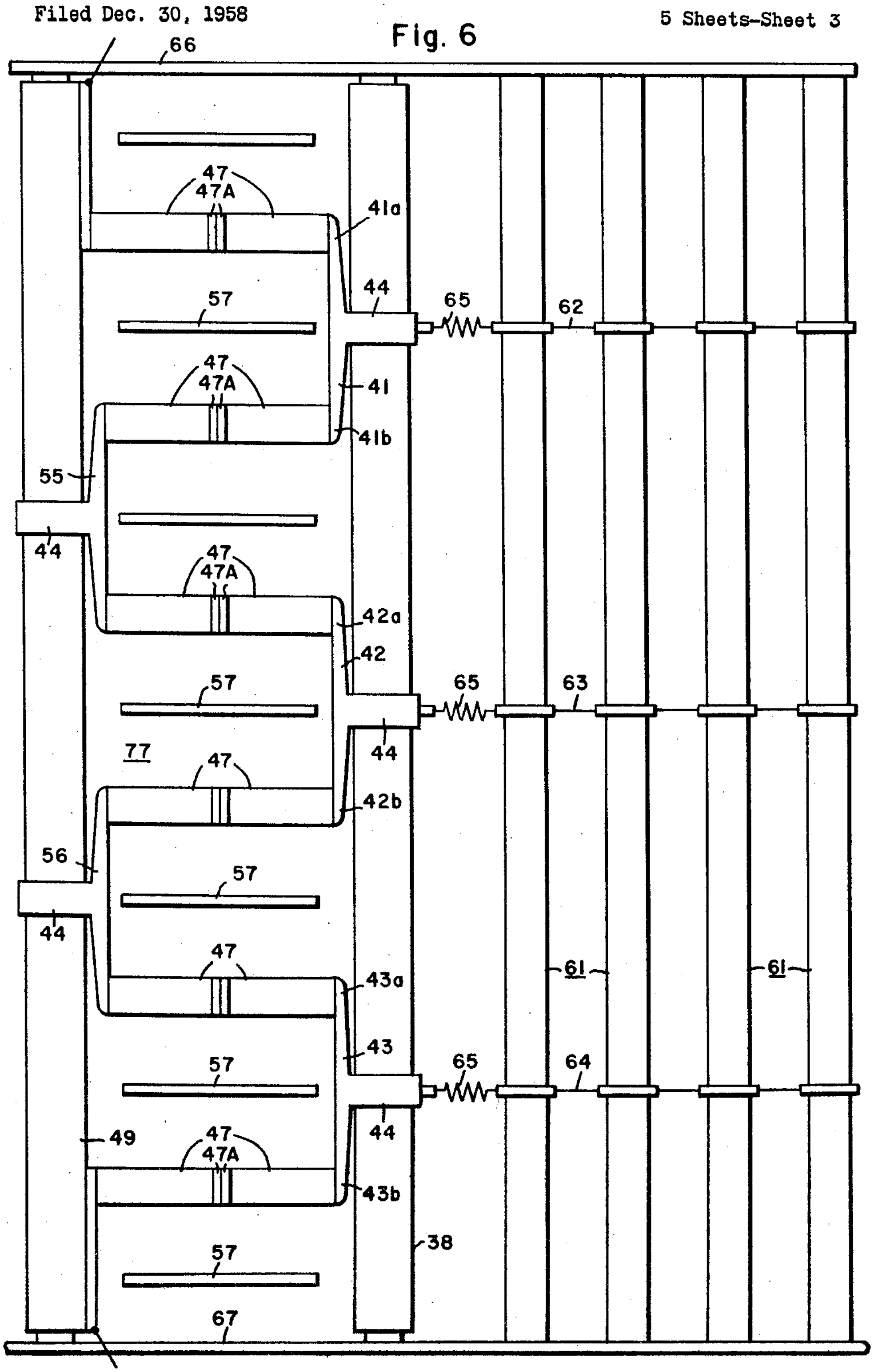
FIG. 6 is a developed view of the contact structure, and the capacitance voltage dividing tubes, which are located interiorly within the insulating casing of the improved interrupting assembly.

With reference to FIG. 6, the driving tube 38 carries a plurality of contact yokes 41—42—43, which have bifurcated clamping portions 44 (FIG. 7). Thus the bifurcated clamping portions 44 are clamped to the insulating driving tube 38 by means of bolts 45 and nuts 46. Disposed at the outer extremities 41*a*, 41*b*, 42*a*, 42*b*, 43*a*, 43*b*, respectively of the contact yokes 41–43 are resilient, rotatable contact fingers 47, with contact tips 47A, which make resilient contacting engagement, as illustrated in FIG. 7.

Figure 8:
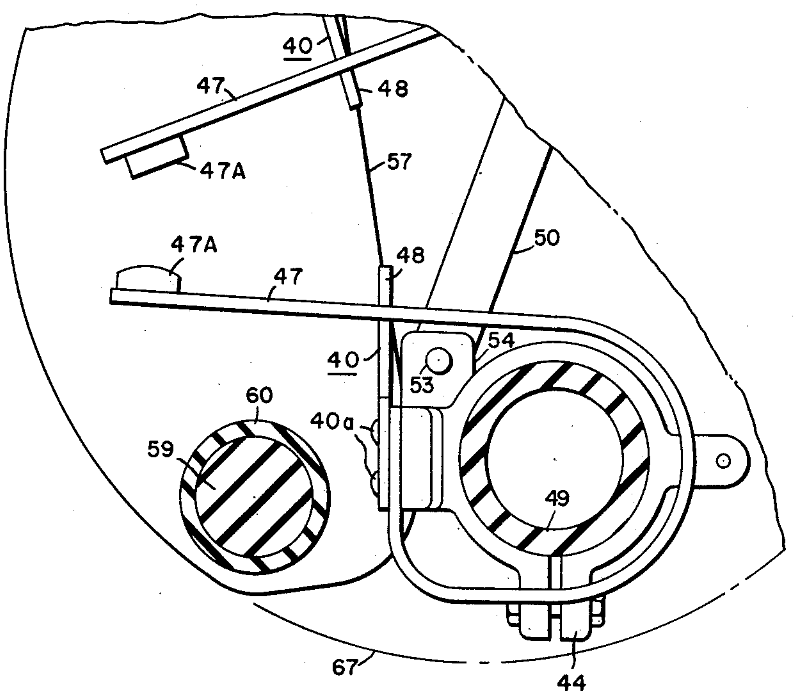
FIG. 8 illustrates a pair of contacts in the partially open-circuit position.
Figure 9:
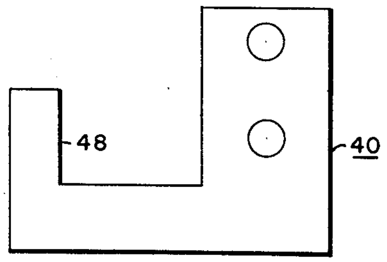
FIG. 9 illustrates, in plan, a stop plate used to accelerate the moving contact to an extremely high initial velocity; and, FIG. 10 illustrates a modification of the invention, in which the interrupting assembly may be utilized in a somewhat conventional circuit-interrupting arrangement.

Contact engaging stops 40, shown in plan in FIG. 9, are secured by bolts 40*a* to the aforesaid yoke extremities 41*a*, 41*b*, etc. as shown in FIGS. 7 and 8. The contact engaging stops 40 have hook portions 48 which strike the contacts with a hammer blow during the opening operation, as described hereinafter. A lost motion 48A exists between the finger contact 47 and the hook portion 48 in the closed position illustrated in FIG. 7.

A second insulating driven supporting tube 49 extends upwardly within the hollow casing 39 of interrupting assembly 7, and is driven by the driving supporting tube 38 by means of a connecting link 50 (FIG. 7). More specifically, the lower end of driving tube 38 has a clamping bracket portion 51, which is pivotally connected at 52 to the connecting link 50. The other end of connecting link 50 is pivotally connected at 53 to a bracket portion 54 clamped to the lower end of driven supporting tube 49. As a result, rotation of the driving tube 38 also effects rotation, in an opposite direction of the driven tube 49 by means of the connecting link 50.

The driven supporting tube 49 likewise has a plurality of contact yokes 55, 56, which carry at their extremities additional contact fingers 47 with contact tips 47A, which resiliently engage the several contact fingers 47 and tips 47A carried by driving insulating tube 38. FIG. 6 more clearly shows the zig-zag, contacting engagement of the several contact tips 47A lengthwise of the insulating casing 39. Disposed between adjacent pairs of contact fingers 47 are insulating plate barriers 57, supported upon support rods 58, 59, being spaced apart by spacing sleeves 60 encircling the rods 58, 59.

The barrier plates 57 prevent flashover between adjacent contact fingers 47 and improve the interrupting ability of the interrupting assembly 7.

To effect a substantially equal division of voltage between the spaced pairs of contact fingers 47, four impedance voltage-dividing tubes 61 are employed. Each capacitance voltage dividing tube 61 encloses a plurality of end-to-end capacitance blocks, and the capacitance tubes 61 are electrically interconnected at spaced points along their length, as illustrated in FIG. 6. At the connecting points 62, 63, 64 (FIG. 6) light tension springs 65 electrically interconnect the contact yokes 41–45 with the intermediate tapping points 62–64 along the four voltage dividing tubes 61.

The extremities of the tubes 61, as well as the ends of the driver and driven supporting tubes 38, 49 are supported in upper and lower end plates 66, 67. The end plates 66, 67 are supported by suitable means, and disposed interiorly within the hollow porcelain casing 39 of interrupting assembly 7.

From the foregoing description, it will be apparent that with the switch closed the main electrical circuit passing through the load-break disconnecting switch, includes terminal pad 11, conducting mechanism housing casting 30, relatively stationary jaw contacts 8, outer extremity 68 of blade contact 9, through disconnecting blade 9 itself to cam housing 26. The circuit then extends through the bearing pivot 25 to casting support 24, and thence to the right-hand terminal pad 12. A paralleling auxiliary circuit exists through the interrupter 7, support 71, and auxiliary blade 10, but this parallel path contains more resistance and carries little current.

During the opening operation, suitable means is employed to effect counter-clockwise rotation of crank arm 13, as viewed from above in FIG. 1. The counter-clockwise rotation of crank arm 13, as viewed from above in FIG. 1, effects, through the linkage 18, corresponding counter-clockwise rotation of crank arm 20, associated with rotatable insulator stack 3. The rotation of insulator stack 3 effects corresponding counter-clockwise rotation of crank arm 33, as indicated by the arrow 69 in FIG. 3, which tends to bring the tension spring 35 to its overcenter position. Meanwhile, the rotation of rotatable insulator stack 5 effects operation of the cam mechanism, within cam housing 26, to first effect axial twisting of main switch blade 9 to release the contact pressure at the contacting end 68 thereof between jaw contacts 8, and to free any ice formation thereat. Continued rotation of rotatable insulator stack 5 effects upward, swinging, rotative motion of main movable disconnecting switch blade 9 upwardly away from stationary jaw contact 8 along the line of travel 70, of FIG. 1, so that an increasing gap distance between contacts 8, 68 forms.

The electrical circuit now passes through the several series contacts 47, associated with interrupting assembly 7, and through stationary contact 71, at the upper end of interrupting assembly 7, through auxiliary switch blade 10 to the pivot bearing 25, where the circuit extends to the right-hand terminal pad 12 shown in FIG. 1.

When the gap distance between the end 68 of main switch blade 9 and stationary jaw contacts 8 is sufficient to withstand surge voltages, at this time the overcenter tension spring 35 (FIG. 3) has been stretched to its overcenter position, as indicated by the dotted line 23. When this occurs, the crank arm 37, associated with driver supporting tube 38, is snapped to its fully open position, as indicated by the dotted line 72 of FIG. 3. This will effect, through the linkage 50, simultaneous rotation of supporting tubes 38, 49 in opposite directions to simultaneously effect a plurality of serially related breaks within the interrupting assembly 7.

It will be noted that, because of the resiliency of the finger contacts 47, that they will not initially separate from each other until the supporting tubes 38, 49 attain considerable rotative velocity. Thus, as the resiliency of the contact fingers 47 has been taken up they are picked up by the hook portions 48 of the stops 40, moving at the velocity of the support tubes 38, 49 and carried to their open position. This gives, in effect, a hammer blow to the contact tips 47A with consequent very rapid separating movement between the cooperable contacts 47, to thereby establish a plurality of serially related arcs, not shown, between the several barrier plates 57. The voltage dividing tubes 61 insure that each series break will carry its full share of the total voltage, and thus the interrupting ability is divided substantially equally among the several pairs of breaks. When the contact structure within the interrupting assembly 7 opens in the preceding manner, the circuit through the load-break disconnecting switch 1 is quickly interrupted.

Continued rotative movement of the movable disconnecting switch blade 9, along the arcuate path of travel 70, effects engagement between pickup arm 29 and the auxiliary switch blade 10. Both blades 9 and 10 then continue to rise to the fully open-circuit position, indicated by the dotted lines 74 of FIG. 1.

During the closing operation, the crank arm 13 of rotatable insulator stack 5 is rotated in a clockwise direction, as viewed from above in FIG. 1. This effects, through the linkage 18, corresponding clockwise rotation of rotatable insulator stack 3 to move the crank arm 33, associated with stub shaft 32, in the closing direction, as indicated by the arrow 75 of FIG. 4. This stretches the overcenter tension spring 35. Meanwhile the auxiliary contact blade 10 has engaged auxiliary upper contact 71, so that when overcenter spring 35 attains its overcenter position, as indicated by the dotted line 76 of FIG. 4 the contact structure 47 will reclose with a snap action interiorly of the interrupting assembly 7. When this occurs the electrical circuit will be completed through the load-break disconnecting switch 1 by way of interrupting assembly 7 and auxiliary contact blade 10. The closing of contact 68 of switch blade 9 with stationary jaw contacts 8 effects a bypassing of the electrical circuit around the interrupting assembly 7, and the switch 1 is then in the closed-circuit position, as illustrated in FIG. 1.

From the foregoing description it will be apparent that there is described a very rapid separating contact structure resulting from the employment of two cooperable rotatable support tubes 38, 49. The resilience of the contact fingers 47 insures a rapid separation therebetween, because the time of takeup of the resilience insures that the supporting tubes 38, 49 have attained considerable rotative velocity. The employment of sulfur hexafluoride ($SF_6$) gas within the region 77, interiorly of the casing 39, insures rapid circuit interruption and also the holding of the circuit voltage in the open-circuit position of the switch 1, immediately prior to lifting auxiliary blade 10 to the open postion.

By interconnecting the rotatable insulator stacks 3, 5, by the linkage 18, at ground potential along the base structure 2, there is provided a simple and easily accessible connecting arrangement. Also the bringing in of the rotative motion to the interrupting assembly 7 through the shaft 32, shielded by the support casting 30 insures that ice formation will not impede proper operation of the over-center spring mechanism 31 and hence the contacts interiorly of interrupting assembly 7.

The present disconnecting switch is capable of handling capacitive circuits including back-to-back capacitors, on a restrike free basis. This prevention of restriking is important to the user so that voltages do not pyramid and cause damage to insulation of apparatus on the system or cause flashovers to ground and establishment of fault conditions.

Two factors are being employed to accomplish this restrike free performance. One is the utilization of $SF_6$ with its high dielectric strength and the other is extremely high initial contact separating speed and establishment of a large gap in a very short period of time.

To separate contacts at this high speed two techniques are employed. One technique is the use of multiple contact structures mounted on parallel shafts which rotate in opposite directions. The second technique is that the contacts 47 are designed to be resilient and coordinated with a positive stop 40 in such a manner that the shafts 38, 49 may start to rotate and get up to speed, at which time the contacts 47 are driven apart by the stops 40 with very high initial velocity by virtue of the shafts already being in motion, instead of just starting from rest. The initial velocity is quite important.

Figure 10:
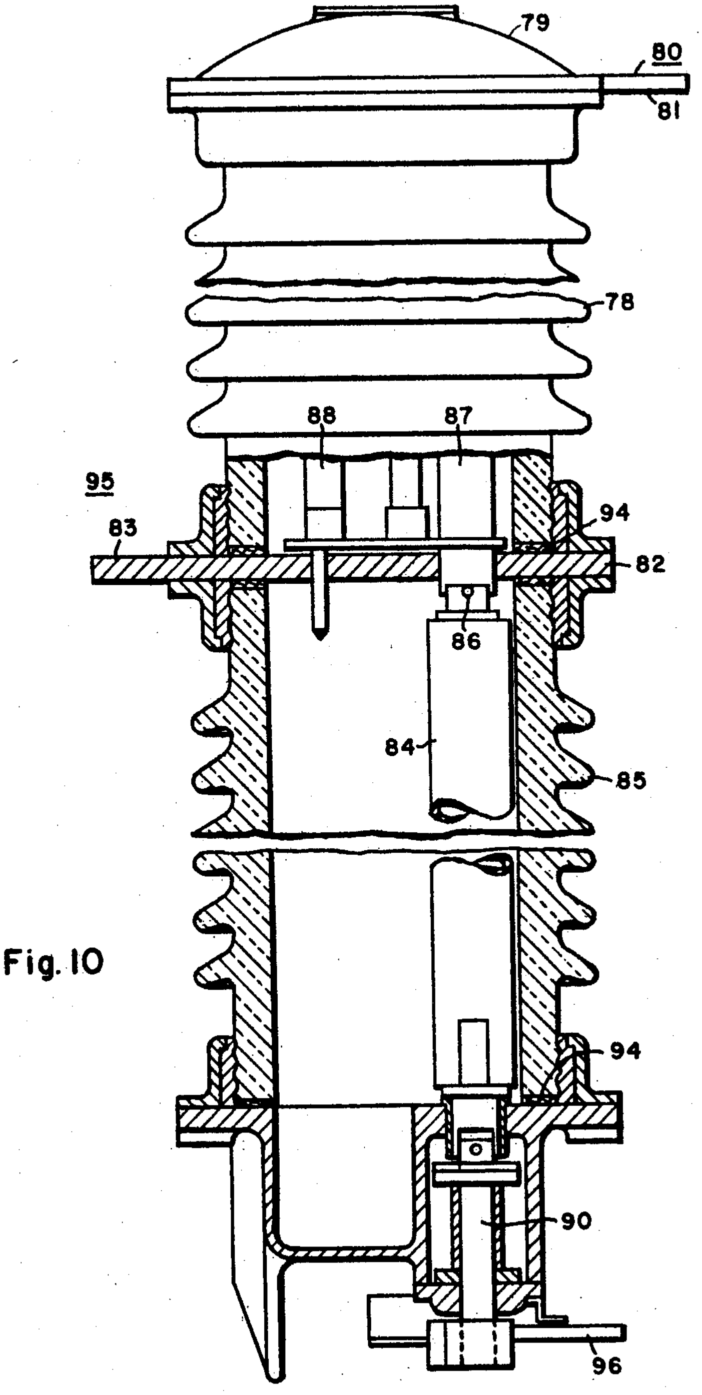

FIG. 10 shows a modification of the invention in which the interrupting assembly is utilized in a somewhat conventional type circuit interrupter. Thus FIG. 10 illustrates the use of certain features of the invention generally in circuit interrupter constructions. As illustrated in FIG. 10, a weatherproof casing 78 is provided, having a cap structure 79 provided at its upper end. Electrically connected to the cap structure 79 is a supporting terminal plate 80, having a terminal pad 81. The plate 80 may be similar to the upper plate 66 of FIG. 6. Also a second terminal supporting plate 82 is provided, having a laterally extending terminal pad 83. Thus the electrical circuit is connected between the two terminals 81, 83.

A rotatable hollow insulating driving tube 84 is provided interiorly of a lower porcelain casing 85. Through a coupling 86 it effects rotation of a drive supporting tube 87, which is analogous to the driver supporting tube 38 of FIG. 7. Cooperating with the supporting tube 87 is a driven tube 88 by a linkage 50, not shown. Each of the supporting tubes 87, 88 carry contact yokes 41–43, 55–56 in the manner illustrated in FIG. 6, together with resilient contact fingers 47 of the type previously described. The external actuation of the lower driver tube 84 may be affected through a gas-tight coupling 90 in a manner set forth and claimed in United States patent application filed April 9, 1956, Serial No. 576,875, by Harry J. Lingal, and assigned to the assignee of the instant application. Suitable gaskets 94 render the modified circuit interrupter 95 gas-tight in construction, so that it is suitable for containing a gas, such as sulfur hexafluoride ($SF_6$) within the interior thereof. The method of contact operation is the same as described heretofore except that in the modified interrupter 95 of FIG. 10, only an external crank arm 96 is illustrated. The rotation of crank arm 96, and hence of the supporting shafts 84, 87 and 88 may be effected by any suitable mechanism, pivotally connected to the outer free end of external crank arm 96.

From the foregoing description it will be apparent that there is provided an improved circuit interrupting construction, which may be used either as the interrupting element of a load-break disconnecting switch, as illustrated in FIG. 1, or as the interrupting element of a somewhat conventional type circuit interrupter, such as illustrated in FIG. 10 of the drawings. Rapid contact separation is achieved, and the advantages of a multiplicity of series breaks are obtained. Rotation of two supporting shafts in opposite directions, speeds up the opening operation, and the resilience of the finger contacts 47 and the coordinated stops 40 insures an extremely fast break when the resiliency has been taken up.

Although there has been illustrated and described certain embodiments of the invention, it is to be clearly understood that the same were merely for the purpose of illustration, and that changes and modifications thereof will readily be apparent to those skilled in the art, without departing from the spirit and scope of the invention.

We claim as our invention:

1. A circuit interrupter including a tubular insulating casing, an insulating rod rotatable within the casing and carrying a plurality of spaced movable bridging contacts therewith, each movable bridging contact having a pair of resilient end contact fingers, a stop member associated with each resilient end contact finger and having a lost-motion connection with respect thereto, a plurality of spaced cooperable movable bridging contact structures mounted longitudinally along the casing, means for effecting motion of said movable bridging contact structures away from the first said movable bridging contacts, rotation of the insulating rod causing engagement and disengagement of the contacts in a generally zig-zag current path, insulating means for spacing the insulating casing away from ground potential, means for actuating the insulating rod from the lower end of the casing, and the casing containing sulfur hexafluoride gas.

2. The combination in a circuit interrupter of a tubular insulating gas-tight casing, a plurality of spaced movable bridging contacts, an operating rod projecting downwardly from the casing for causing rotation of the movable bridging contacts, each movable bridging contact having a pair of resilient end contact fingers, a stop member associated with each resilient end contact finger and having a lost-motion connection with respect thereto, a plurality of spaced movable cooperable contact structures mounted longitudinally along the casing, means for effecting motion of said movable bridging contact structures away from the first said movable bridging contacts, the current path through the circuit interrupter being generally of zig-zag configuration, insulating means mounting the insulating casing above ground potential, operating means at ground potential for causing rotation of the operating rod, and said gas-tight casing containing sulfur hexafluoride gas.

3. A multiple-break circuit interrupter including two cooperable sets of U-shaped bridging contacts, each movable bridging contact having a pair of resilient end contact fingers, a stop member associated with each resilient end contact finger and having a lost-motion connection with respect thereto, means for causing simultaneous movement of both sets of U-shaped bridging contacts, and the separation of the two sets of U-shaped bridging contacts creating a multiplicity of serially related arcs in the circuit.

4. A circuit interrupter including a gas-tight casing, an arc-extinguishing gas disposed within said gas-tight casing, a pair of rotatable insulating operating rods extending longitudinally interiorly within said gas-tight casing, at least one operating rod extending exteriorly of said gas-tight casing, connecting means linking the two rods together for simultaneous rotation thereof, each insulating operating rod carrying a plurality of U-shaped bridging contacts, each movable bridging contact having a pair of resilient end contact fingers, a stop member associated with each resilient end contact finger and having a lost-motion connection with respect thereto, and the U-shaped bridging contacts providing a generally zig-zag circuit path axially of the gas-tight casing.

5. A load-break disconnecting switch including an air-break disconnecting switch and an interrupting assembly, the disconnecting switch including a main disconnecting switch blade cooperable with stationary jaw-type disconnecting contacts, said interrupting assembly being mounted adjacent the stationary disconnecting contacts and including an elongated hollow cylindrical casing, a pair of insulating operating rods extending within said casing longitudinally thereof, a plurality of U-shaped bridging contacts carried by one operating rod, a plurality of cooperable U-shaped bridging contacts carried by the other operating rod to establish a zig-zag current path, each movable bridging contact having a pair of resilient end contact fingers, a stop member associated with each resilient end contact finger and having a lost-motion connection with respect thereto, and means for causing simultaneous rotation of both operating rods to effect thereby a multiplicity of serially related breaks in the circuit..

6. A load break disconnecting switch including a base, an air-break disconnecting switch and an interrupting assembly, a rotatable insulator stack for operating said air-break disconnecting switch, a rotatable insulator stack for operating said interrupting assembly, connecting means extending along the base for interconnecting rotation of said two rotatable insulator stacks, the disconnecting switch including a main disconnecting switch blade cooperable with stationary jaw-type disconnecting contacts, said interrupting assembly being mounted adjacent the stationary disconnecting contacts and including an elongated hollow cylindrical casing, a pair of insulating operating rods extending within said casing longitudinally thereof, a plurality of U-shaped bridging contacts carried by one operating rod, a plurality of cooperable U-shaped bridging contacts carried by the other operating rod to establish a generally zig-zag current path, and means for causing simultaneous rotation of both operating rods to effect thereby a multiplicity of serially related breaks in the circuit.

7. A circuit interrupter including a pair of parallel disposed, insulating, rotatable operating rods, each operating rod carrying a plurality of yoke-shaped contact supports in spaced relation, one or more of the yoke-shaped contact supports carrying at the extremities thereof resilient finger contacts, the finger contacts carried by one insulating operating rod cooperating with the finger contacts carried by the other insulating operating rod to establish a zig-zag current path, a stop member associated with each resilient contact finger and having a lost-motion connection with respect thereto whereby the several lost-motion connections are taken up during the opening operation to give hammer opening blows to the separating motion of the contact fingers, and means for effecting simultaneous rotation of the two operating rods.

8. A load-break disconnecting switch including a base, an air-break disconnecting switch and an interrupting assembly, a rotatable insulator stack for operating said air-break disconnecting switch, a rotatable insulator stack for operating said interrupting assembly, connecting means extending along the base for interconnecting rotation of said two rotatable insulator stacks, the disconnecting switch including a main disconnecting switch blade cooperable with stationary jaw-type disconnecting contacts, said interrupting assembly being mounted adjacent the stationary disconnecting contacts and including an elongated hollow cylindrical casing, a pair of insulating operating rods extending within said casing longitudinally thereof, a plurality of U-shaped bridging contacts carried by one operating rod, a plurality of cooperable U-shaped bridging contacts carried by the other operating rod to establish a zig-zag current path, means for causing simultaneous rotation of both operating rods to effect thereby a multiplicity of serially related breaks in the circuit, and an over-center spring toggle mechanism disposed adjacent said stationary jaw-type disconnecting contacts for interconnecting rotation of said second-mentioned rotatable insulator stack with rotation of said operating rods within the hollow casing.

9. A circuit interrupter including a pair of rotatable operating rods, a hook-shaped stop member secured to and rotatable with each of said rotatable operating rods, a resilient finger contact secured to each rotatable operating rod and engaged by a respective hook-shaped stop member during the opening operation, and the cooperable resilient finger contacts engaging each other in the closed-circuit position.

10. A multibreak circuit interrupter including a pair of substantially parallel rotatable operating rods, a plurality of resilient contact fingers secured to and rotatable with each of said operating rods, the finger contacts cooperating to establish a generally zig-zag current path through the interrupter, a stop member associated with each resilient contact finger and rotatable with the respective operating rod, each stop member having a lost-motion connection with respect to its particular resilient contact finger, whereby the several lost-motion connections are taken up during the opening operation to give hammer opening blows to the separating motion of the contact fingers for fast separating opening motion of the contact fingers.

References Cited in the file of this patent

UNITED STATES PATENTS

| | | |
|---|---|---|
| 707,843 | Heany | Aug. 26, 1902 |
| 925,994 | Cheney | June 22, 1909 |
| 976,549 | Cheney | Nov. 22, 1910 |
| 1,493,038 | Huseth et al. | May 6, 1924 |
| 2,425,159 | Meyer | Aug. 5, 1947 |
| 2,568,008 | Jansson | Sept. 18, 1951 |
| 2,769,063 | Lingal | Oct. 30, 1956 |
| 2,806,110 | Leeds | Sept. 10, 1957 |
| 2,810,805 | Schwager | Oct. 22, 1957 |
| 2,821,588 | Fisher | Jan. 28, 1958 |

FOREIGN PATENTS

| | | |
|---|---|---|
| 625,176 | Germany | Feb. 5, 1936 |